Aug. 21, 1934.  W. BAUERSFELD  1,970,728
MICROSCOPE HAVING AN INCLINED OCULAR TUBE
AND A REVOLVING NOSE PIECE
Filed March 22, 1934
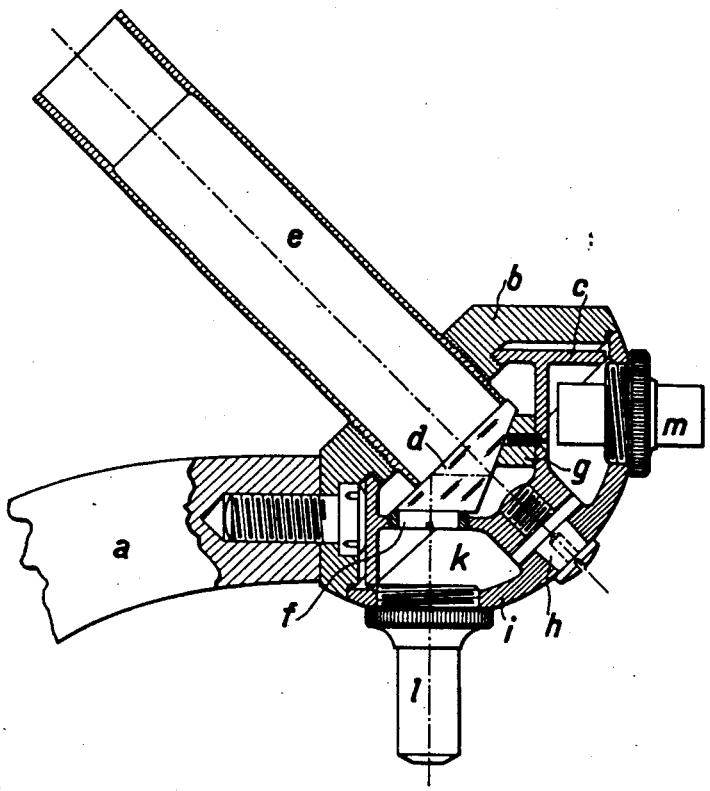
Inventor:
Walther Bauersfeld.

Patented Aug. 21, 1934

1,970,728

UNITED STATES PATENT OFFICE 1,970,728

MICROSCOPE HAVING AN INCLINED OCULAR TUBE AND A REVOLVING NOSE-PIECE

Walther Bauersfeld, Jena, Germany, assignor to the firm Carl Zeiss, Jena, Germany Application March 22, 1934, Serial No. 716,799
In Germany March 27, 1933

3 Claims. (Cl. 88—39)

The invention concerns a microscope which has an inclined ocular tube, a reflecting system for deflecting the pencil of imaging rays in the direction of the axis of the ocular tube, and a nose-piece consisting of a stationary and a rotatable part. Manufacturing the known constructional forms of microscopes of this kind is not very simple because parts are concerned which have surfaces of revolution whose axes of rotation are inclined relatively to each other.

The invention consists in so constructing the microscope that the surfaces of revolution have a common axis of rotation. This kind of construction largely simplifies the manufacture of the said parts. The desired simplification is arrived at by so disposing the axis of rotation of the objective nose-piece as to have it coincide with the axis of the ocular tube and thus making the entire microscope represent a body of revolution about one axis. The construction of the microscope is especially simple when the stationary part of the nose-piece is rigidly connected to the ocular tube and contains the reflecting system deflecting the pencil of imaging rays in the direction of the axis of the ocular tube. With a view to avoiding the necessity of manipulating the focusing device of the microscope when objectives of a comparatively great difference of distance from the object are to be exchanged for each other, it is advisable to provide an annular space in the stationary part of the nose-piece, this space being adapted to receive part of the microscope objectives attached to the rotatable part of the nose-piece. It is thus made possible that, simply by rotating the nose-piece, also objectives which have a great focal length may be given that position relative to the object in which the distance of the object is approximately equal to the one required for microscopically imaging the object, only small movements being necessary for producing the microscopic image in the focal plane of the eye-piece.

The accompanying drawing represents a constructional example of the invention in central section.

To the upper end of a microscope stand $a$, which supports the observation parts, is screwed a part $b$ of the form of the frustum of a cone. This part $b$ is also screwed to a part $c$, $b$ and $c$ representing the stationary part of the nose-piece, whose axis is inclined at approximately 45° relatively to a vertical line. In the interior between the parts $b$ and $c$ is disposed a reflecting prism $d$ which rests by means of an axially disposed ocular tube $e$ against the part $b$ and by means of a ring $f$ and a wedge-shaped piece $g$ against the part $c$. Into this part $c$ a bolt $h$ is screwed in such a manner that its axis is identical with that of the ocular tube $e$. This bolt $h$ represents the axle of rotation of the rotatable part of the nose-piece, which is a spherical plate $i$. The stationary part $b$, $c$ of the nose-piece contains an annular space $k$ into which microscope objectives may extend without their obstructing the rotations of the plate $i$. An objective $l$ of a short focal length is so provided in the rotatable plate $i$ that it extends principally towards outside. Another objective $m$, which is provided in the plate $i$ and has a great focal length will have its threaded portion nearer its end containing the front lens, and it will therefore extend into the space $k$ very much.

The example represented by the drawing shows the exceedingly simple construction of the microscope and of the nose-piece representing a body of revolution about the axis of the ocular tube. The pencil of light rays, which enters the objective in vertical direction, is deflected twice by the reflecting prism $d$ and enters the ocular tube $e$ in the direction of the axis of same. A change from the one objective to the other is effected by rotating the plate $i$ about the bolt $h$.

I claim:

1. A microscope comprising a stand, an ocular tube, a reflecting system, a revolving nose-piece consisting of an upper part fixed to the said stand and a lower part which is rotatable about an axis and lies against the said upper part, and at least two microscope objectives provided in the said lower part, the axis of rotation of this lower part coinciding with the axis of the said ocular tube.

2. A microscope according to claim 1, the said ocular tube being fixed to the upper part of the said nose-piece, this upper part containing the said reflecting prism.

3. A microscope comprising a stand, an ocular tube, a reflecting prism, a revolving nose-piece consisting of an upper part fixed to the said stand and a lower part which is rotatable about an axis and lies against the said upper part, and at least two microscope objectives provided in the said lower part, the axis of rotation of this lower part coinciding with the axis of the said ocular tube, and the said upper part having an annular space, at least one of the said microscope objectives extending into this space.

WALTHER BAUERSFELD.